(12) United States Patent
Nuttall et al.

(10) Patent No.: US 9,565,954 B2
(45) Date of Patent: Feb. 14, 2017

(54) OPEN FRONTED CABINET

(71) Applicant: The Alan Nuttall Partnership Limited, Leicestershire (GB)

(72) Inventors: Alan Nuttall, Copston Magna (GB); Michael Steele, Sapcote (GB); Robert Bowles, Birmingham (GB); James Geary, Hinckely (GB)

(73) Assignee: The Alan Nuttall Partnership Limited, Hinckley, Leicestershire (GB)

( * ) Notice: Subject to any disclaimer, the term of this patent is extended or adjusted under 35 U.S.C. 154(b) by 0 days.

(21) Appl. No.: 15/087,097

(22) Filed: Mar. 31, 2016

(65) Prior Publication Data
US 2016/0213168 A1 Jul. 28, 2016

Related U.S. Application Data

(63) Continuation of application No. 14/419,949, filed as application No. PCT/GB2013/052887 on Nov. 5, 2013.

(30) Foreign Application Priority Data

| Nov. 6, 2012 | (GB) | 1219949.3 |
| May 16, 2013 | (GB) | 1308830.7 |
| Sep. 24, 2013 | (GB) | 1316909.9 |

(51) Int. Cl.
  A47B 71/00 (2006.01)
  A47B 81/00 (2006.01)
  (Continued)

(52) U.S. Cl.
  CPC ............ *A47F 7/0071* (2013.01); *A47B 71/00* (2013.01); *A47B 81/00* (2013.01); *A47F 3/001* (2013.01);
  (Continued)

(58) Field of Classification Search
  None
  See application file for complete search history.

(56) References Cited

U.S. PATENT DOCUMENTS 2,952,992 A   9/1960 Voorhies
2,994,760 A * 8/1961 Pecoraro ................. F24C 7/06
                                                  219/394

(Continued)

FOREIGN PATENT DOCUMENTS

BE   475700 A    9/1947
EP   0140453 A2  5/1985
(Continued)

OTHER PUBLICATIONS

Combined Search and Examination Report dated Mar. 27, 2014 in priority GB Application No. 1316909.9.
(Continued)

*Primary Examiner* — Joseph M Pelham
(74) *Attorney, Agent, or Firm* — Downs Rachlin Martin PLLC

(57) ABSTRACT

The present invention relates to an open fronted food storage cabinet. The cabinet has a top, rear, base and opposed sides. The top, rear, base and opposing sides define an interior space of the cabinet which is accessible through an opening to the front of the cabinet. The opening is defined between edges of the top, base and opposing sides of the cabinet. The cabinet includes an interior chassis structure comprised of a base panel, a rear panel and a top panel which are mechanically connected to one another. The base, rear and top panels are each formed from a structural sandwich composite material having thermal insulation properties. The rear panel includes an aperture to which a mechanism operable to alter the temperature within interior space of the cabinet is mounted.

15 Claims, 10 Drawing Sheets

(51) Int. Cl.
| | | |
|---|---|---|
| *A47F 3/00* | (2006.01) | |
| *A47F 7/00* | (2006.01) | |
| *F24H 3/02* | (2006.01) | |
| *F24H 9/18* | (2006.01) | |
| *A47J 36/24* | (2006.01) | |
| *A47J 39/00* | (2006.01) | |
| *A47F 3/04* | (2006.01) | |
| *F25B 21/02* | (2006.01) | |

(52) U.S. Cl.
CPC ........... *A47F 3/0439* (2013.01); *A47F 3/0443* (2013.01); *A47J 36/24* (2013.01); *A47J 39/003* (2013.01); *F24H 3/02* (2013.01); *F24H 9/1863* (2013.01); *F25B 21/02* (2013.01); *A47B 2220/008* (2013.01)

(56) References Cited

U.S. PATENT DOCUMENTS

| | | | |
|---|---|---|---|
| 3,147,602 A | 9/1964 | Beckwith | |
| 3,304,740 A | 2/1967 | Dickson et al. | |
| 3,632,968 A * | 1/1972 | Wilson | A47J 39/02 219/214 |
| 4,019,339 A * | 4/1977 | Anderson | F25D 19/02 62/255 |
| 4,283,614 A * | 8/1981 | Tanaka | H05B 6/6411 126/21 A |
| 4,327,279 A | 4/1982 | Guibert | |
| 4,381,442 A | 4/1983 | Guibert | |
| 4,395,233 A * | 7/1983 | Smith | F26B 21/02 126/21 A |
| 4,455,478 A | 6/1984 | Guibert | |
| 5,086,693 A | 2/1992 | Tippmann et al. | |
| 5,475,987 A | 12/1995 | McGovern | |
| 5,501,076 A * | 3/1996 | Sharp, III | F25B 21/02 62/3.2 |
| 5,532,456 A | 7/1996 | Smith et al. | |
| 5,558,010 A | 9/1996 | Shelton | |
| 5,618,458 A * | 4/1997 | Thomas | F24C 3/124 126/194 |
| 5,747,775 A * | 5/1998 | Tsukamoto | A21B 1/245 200/333 |
| 6,073,547 A | 6/2000 | Westbrooks, Jr. et al. | |
| 6,111,224 A * | 8/2000 | Witt | H05B 3/00 219/214 |
| 6,384,380 B1 * | 5/2002 | Faries, Jr. | A61G 12/001 219/385 |
| 6,619,814 B1 * | 9/2003 | Hamada | A47F 3/001 362/125 |
| 6,742,344 B2 | 6/2004 | Vormedal | |
| 7,129,447 B1 * | 10/2006 | Kim | F24C 15/166 126/337 R |
| 7,829,823 B2 | 11/2010 | Nuttall et al. | |
| 7,905,173 B2 * | 3/2011 | Sus | F24C 15/166 219/214 |
| 8,468,836 B2 | 6/2013 | Tuskiewicz et al. | |
| 8,729,429 B2 | 5/2014 | Nuttall et al. | |
| 2002/0005686 A1 | 1/2002 | Nuttall et al. | |
| 2002/0060215 A1 * | 5/2002 | Allera | F24C 7/06 219/394 |
| 2002/0121095 A1 * | 9/2002 | Adamski | F25B 21/04 62/3.6 |
| 2003/0047553 A1 * | 3/2003 | Patti | F24C 7/082 219/400 |
| 2003/0154733 A1 * | 8/2003 | Ruiz | A47F 3/001 62/246 |
| 2003/0233841 A1 | 12/2003 | Yingst | |
| 2004/0177634 A1 | 9/2004 | Yamazaki et al. | |
| 2004/0226932 A1 | 11/2004 | Flinn | |
| 2005/0076662 A1 | 4/2005 | Roche et al. | |
| 2005/0217297 A1 | 10/2005 | Wilson | |
| 2006/0059934 A1 | 3/2006 | Howington et al. | |
| 2006/0118542 A1 * | 6/2006 | Oh | F24C 15/325 219/400 |
| 2008/0098907 A1 * | 5/2008 | Peters | A47J 39/003 99/483 |
| 2008/0245783 A1 * | 10/2008 | Aoyama | A47J 39/006 219/448.12 |
| 2008/0283440 A1 | 11/2008 | Hartsfield, Jr. et al. | |
| 2008/0284296 A1 | 11/2008 | Nuttall et al. | |
| 2009/0056558 A1 * | 3/2009 | Cretors | A23L 1/1815 99/323.8 |
| 2010/0059498 A1 * | 3/2010 | Hansen | A61M 5/445 219/400 |
| 2010/0115969 A1 * | 5/2010 | Tuszkiewicz | A47F 3/001 62/3.3 |
| 2011/0030565 A1 * | 2/2011 | Shei | A47J 39/006 99/329 P |
| 2011/0049119 A1 | 3/2011 | Nuttall et al. | |
| 2011/0114625 A1 | 5/2011 | Chung et al. | |
| 2011/0252813 A1 * | 10/2011 | Veltrop | A47J 36/2483 62/3.3 |
| 2014/0292168 A1 * | 10/2014 | Nevarez | A47F 3/001 312/236 |
| 2015/0230631 A1 | 8/2015 | Nuttall | |

FOREIGN PATENT DOCUMENTS

| | | |
|---|---|---|
| GB | 694610 | 7/1953 |
| GB | 1000343 | 8/1965 |
| GB | 2482782 A | 2/2012 |
| WO | 03099077 A1 | 12/2003 |
| WO | 2004005819 A2 | 1/2004 |
| WO | 2006111767 A1 | 10/2006 |
| WO | 2006122428 A1 | 11/2006 |
| WO | 2007053002 A1 | 5/2007 |
| WO | 2014072693 A1 | 5/2014 |

OTHER PUBLICATIONS

PCT International Search Report and Written Opinion dated Mar. 5, 2014 in related International Application No. PCT/GB2013/052887.
Notice of Allowance dated Aug. 22, 2016, in related U.S. Appl. No. 14/419,949, filed Feb. 6, 2015.
Non-Final Office Action dated Jun. 8, 2016, in related U.S. Appl. No. 14/419,949, filed Feb. 6, 2015.

* cited by examiner

OPEN FRONTED CABINET

The present invention relates to a food storage unit. In particular, the present invention relates to a temperature controlled open fronted cabinet for the display and vending of foodstuffs.

The food service industry currently relies on multi-tiered display cabinets that either have no form of temperature control within, or have either refrigerated or heated interiors. The cabinets themselves can only perform a single function generally within the cabinet interiors that creates a temperature regime for the entire contents of the cabinet at the same or similar temperatures.

There are numerous heated cabinets available that allow modification of heated shelf temperatures that differ within the cabinet, however due to the constraints of the cabinets, the shelves are not discreet with respect to each other and thus affect the surrounding shelves by either conduction or convection of heat to bring about a cumulative increase in temperature throughout the cabinet. Some existing designs use a partition within the overall cabinet, usually horizontal, to make the shelves into discreet areas that are heated independently. The propensity of such heated cabinets to lose heat either by conduction, radiation or convection make the integration of refrigerated areas and heated areas very difficult to separate.

According to a first aspect of the present invention there is provided an open fronted food storage cabinet having a top, rear, base and opposed sides, the top, rear, base and opposing sides defining an interior space of the cabinet which is accessible through an opening to the front of the cabinet defined between edges of the top, base and opposing sides of the cabinet, wherein the cabinet includes an interior chassis structure comprised of a base panel, a rear panel and a top panel which are mechanically connected to one another, wherein further the base, rear and top panels are each formed from a structural sandwich composite material having thermal insulation properties, and wherein further the rear panel includes an aperture to which a mechanism operable to alter the temperature within interior space of the cabinet is mounted.

The chassis serves as both a structural member to which other components of the cabinet are attached and to provide thermal insulation so as to, in use, enable the interior space of the cabinet to be maintained at a desired temperature.

The structural sandwich composite material may include an inner core of expanded polymer and outer metal layers. The expanded polymer may be expanded polystyrene. Alternatively, the expanded polymer may be expanded polypropylene. The outer metal layers of the composite material may be Aluminium alloy.

The sides of the cabinet comprise side panels which are mounted to the structural chassis of the cabinet. The side panels may advantageously be at least partially transparent. The side panels may be mounted to the structural chassis by fasteners which extend through apertures of the side wall and into fixtures located within or on the faces of the panels of the chassis.

The mechanism operable to alter the temperature within interior space of the cabinet is in the form of a cassette which is fittable to and removable from the aperture in the rear panel of the chassis. The cassette may thus be constructed and tested independently of the chassis before fitment thereto. In the event that the cassette needs replacement during the life of the cabinet it can be easily removed and replaced.

The mechanism operable to alter the temperature within interior space of the cabinet may be a heating mechanism. The heating mechanism may include an electric heating element and a fan.

The cabinet may includes an additional heating means provided in a lower region of the cabinet interior space. The additional heating means may be a heated floor of the cabinet interior space. The heated floor may comprise a glass or ceramic glass plate and an electrical resistance heater. The heated floor of the cabinet is preferably operable independently of the fan and heating element heating mechanism.

Alternatively, the mechanism operable to alter the temperature within interior space of the cabinet may be a cooling mechanism. The cooling mechanism may include a vapour compression refrigeration circuit and a fan. Alternatively the cooling mechanism may include a Peltier device with or without a fan.

According to a further aspect of the present invention there is provided an open fronted food storage cabinet having a top, rear, base and opposed sides, the top, rear, base and opposing sides defining an interior space of the cabinet which is accessible through an opening to the front of the cabinet defined between edges of the top base and opposing sides of the cabinet, wherein the cabinet includes an interior chassis structure comprised of a base panel, an upper rear panel, a lower rear panel, a top panel and an intermediate panel which are mechanically connected to one another, the intermediate panel being positioned between the upper and lower rear panels to divide the interior space into an upper portion and a lower portion, wherein further the base, rear, intermediate and top panels are each formed from a structural sandwich composite material having thermal insulation properties, and wherein further at least on of the rear panel includes an aperture to which a mechanism operable to alter the temperature within interior space of the cabinet is mounted.

The intermediate panel serves both as a base for the upper portion of the interior space and as a top for the lower portion of the interior space. The intermediate panel further provides a thermal barrier between the upper and lower portions of the interior space. The temperature within each portion of the interior space can thus be managed independently of the other. For example, one portion of the interior space can be heated and the other chilled. Alternatively, one portion of the interior space can be heated to a first temperature and the other portion heated to a different second temperature. In yet an alternative embodiment, one of the portions of the interior space may be heated or chilled, and the other portion of the interior space maintained at an ambient temperature. It will be understood that these combinations are not intended to be limiting and that other combinations are possible.

Subsidiary features described with reference to the first aspect of the present invention are equally applicable to the cabinet of the second aspect.

An embodiment of the present invention will now be described with reference to the accompanying drawings in which.

Figure 1:
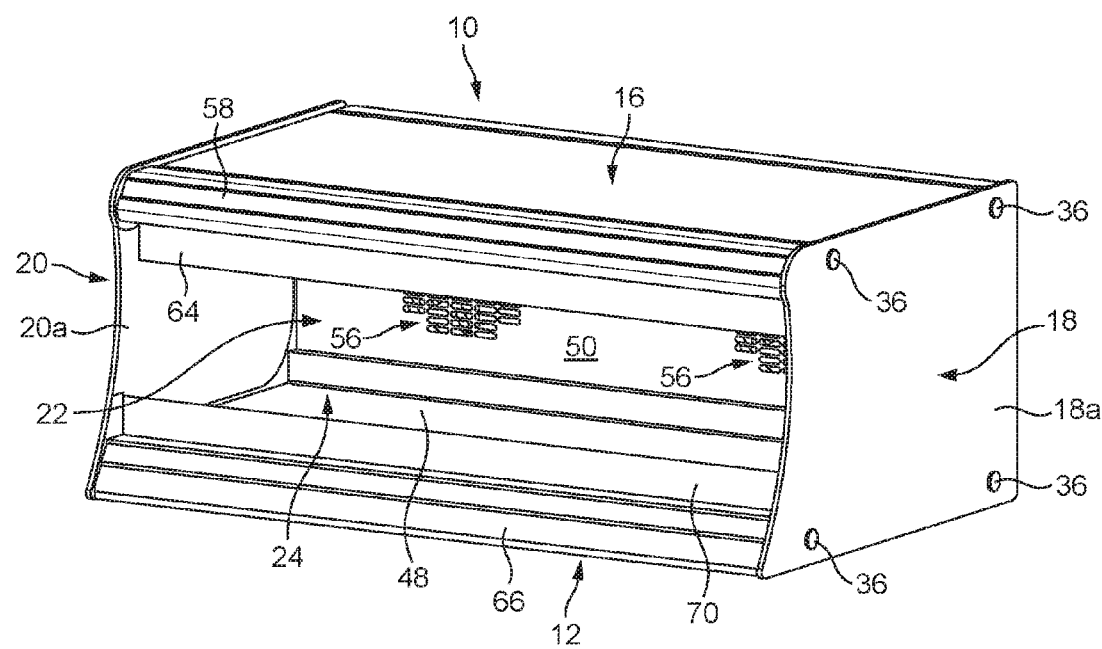
FIG. 1 shows a perspective view of a cabinet according to a first aspect the present invention.
Figure 2:
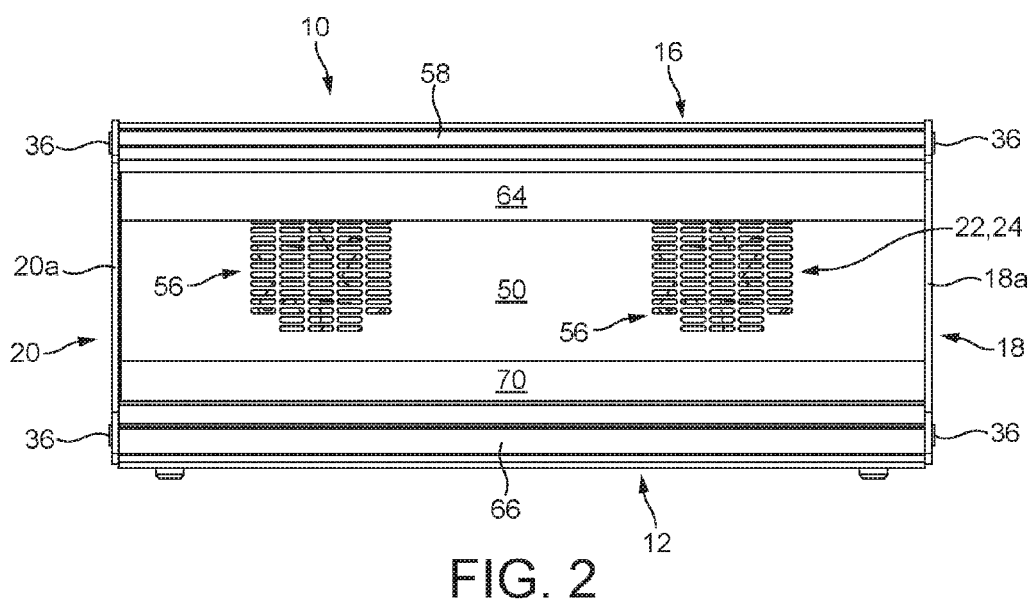
FIG. 2 shows a front view of the cabinet.
Figure 3:
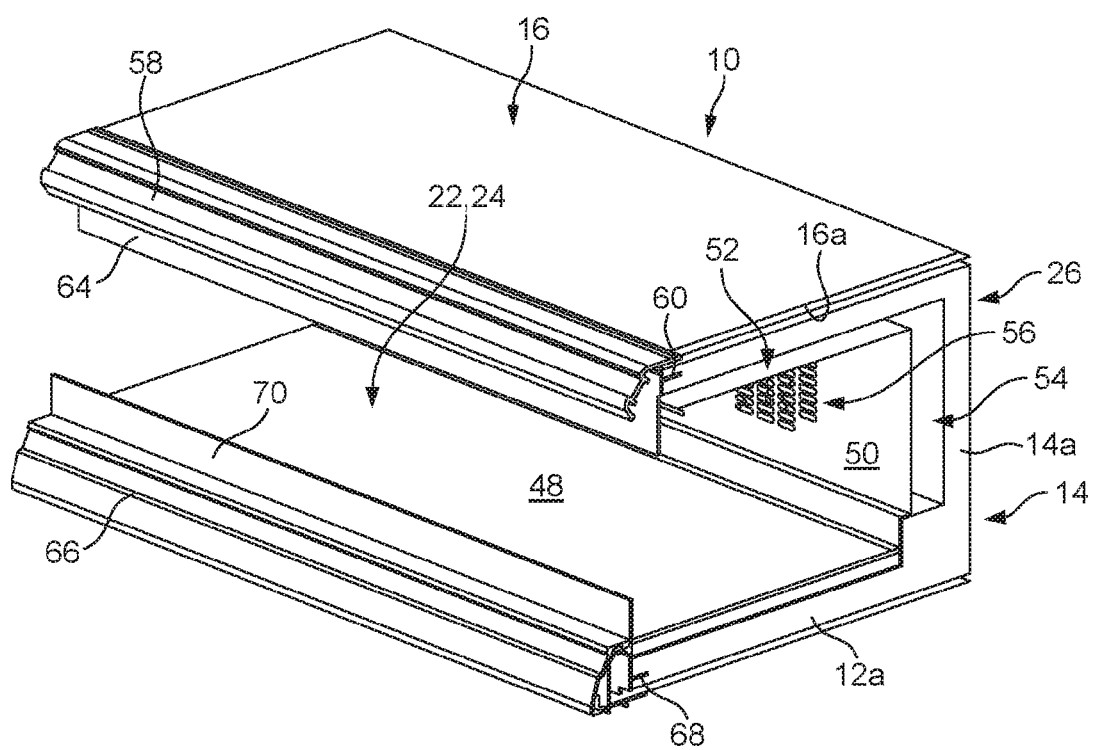
FIG. 3 shows a perspective view of the cabinet with the side panels removed.

Referring to FIGS. 1 to 6 of the drawings there is shown an open fronted cabinet generally designated 10. The cabinet 10 includes a base 12, a rear 14, a top 16 and opposed sides 18,20. The base, rear, top and sides 12,14,16,18,20 define an interior space 22 of the cabinet 10. The open front 24 of the cabinet 10 is defined between respective edges of the base, top and sides 12,16,18,20.

The interior space 22 of the cabinet 10 defines a space within which foodstuffs can be placed for subsequent selection and retrieval by a consumer. The consumer is able to reach into the interior space 22 through the open front 24 in order to retrieve their selection.

Within the cabinet 10 there is provided a generally "C" or "U" shaped subassembly 26. The subassembly 26, hereinafter referred the chassis of the cabinet 10, defines the primary structural component of the cabinet 10.

Figure 6:
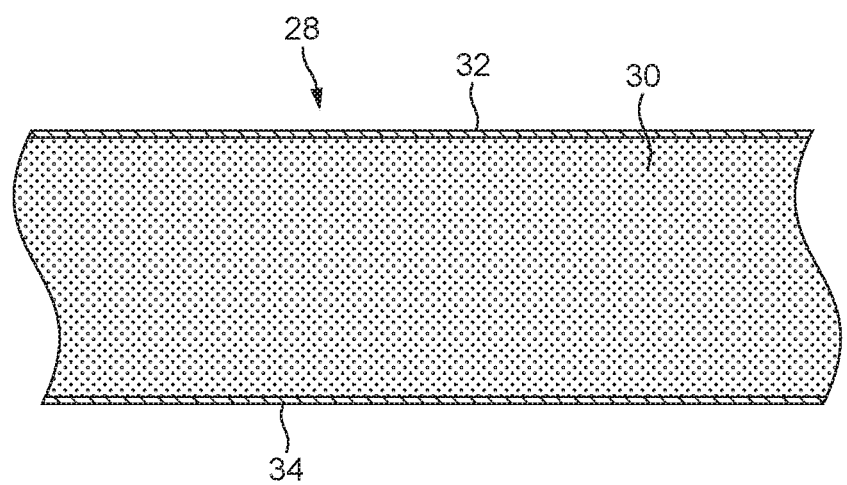
FIG. 6 shows a cross-sectional view of the composite material of the chassis of the cabinet.
Figure 7:
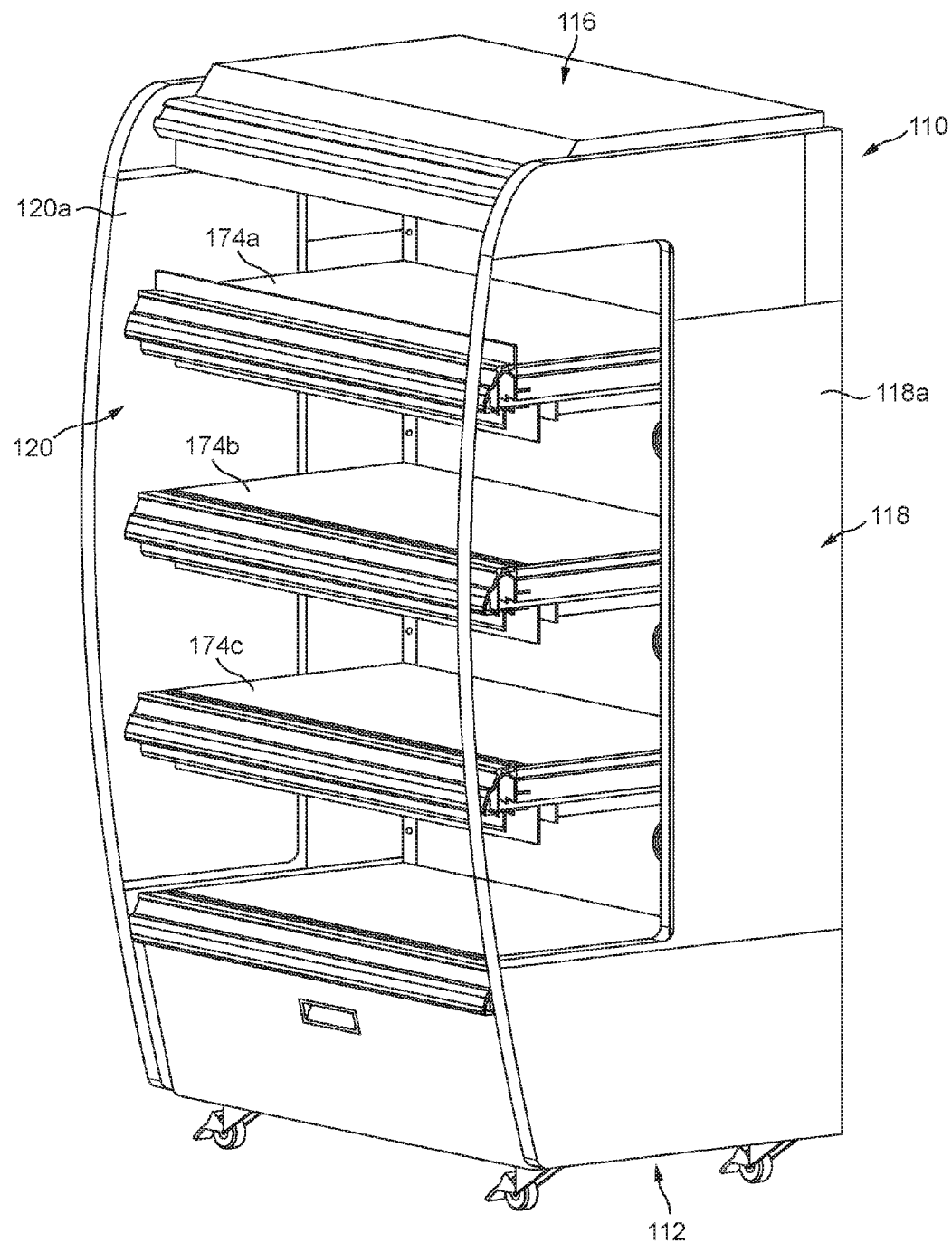
FIG. 7 shows a perspective view of a cabinet according to a first aspect the present invention.
Figure 8:
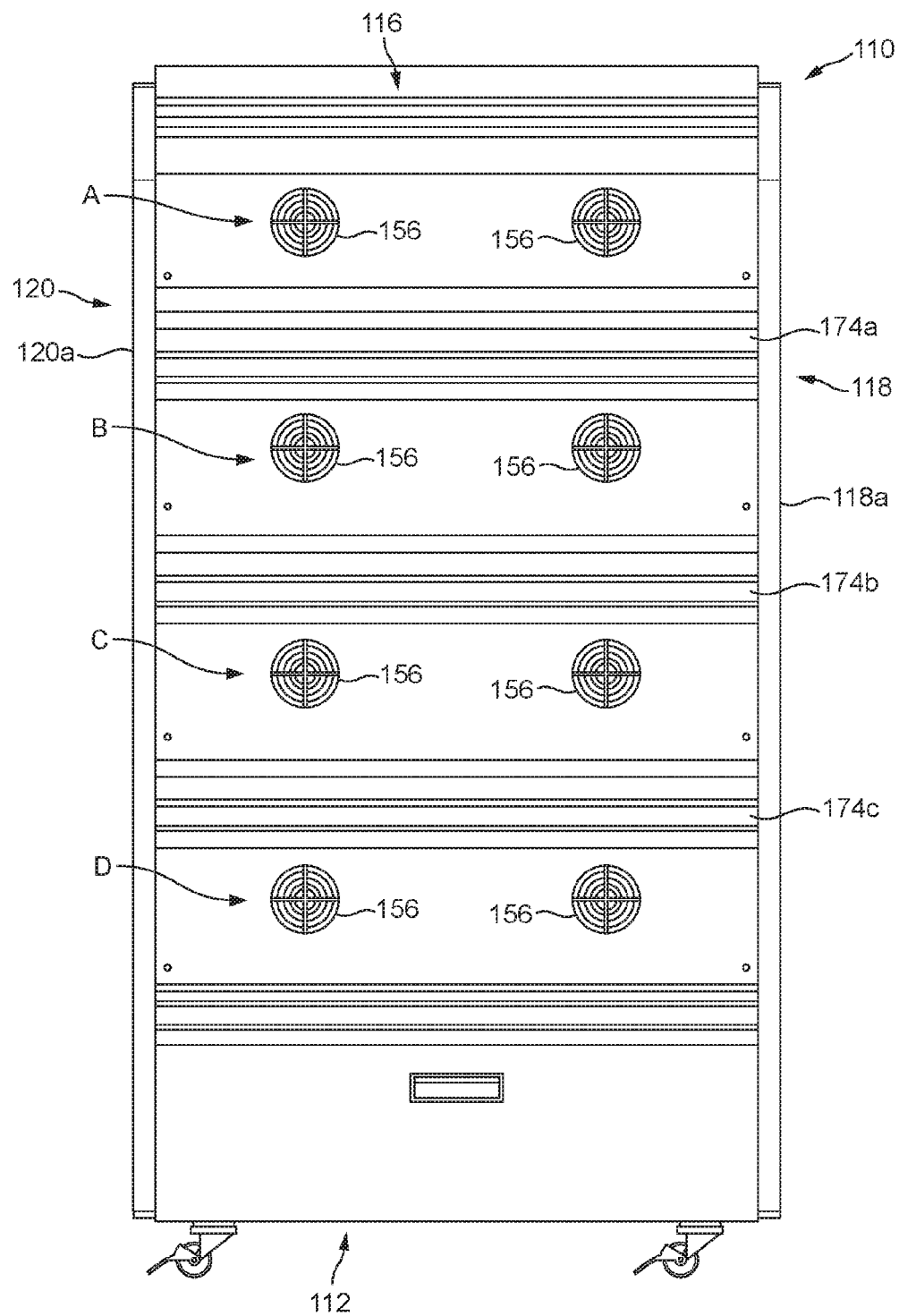
FIG. 8 shows a front view of the cabinet.
Figure 9:
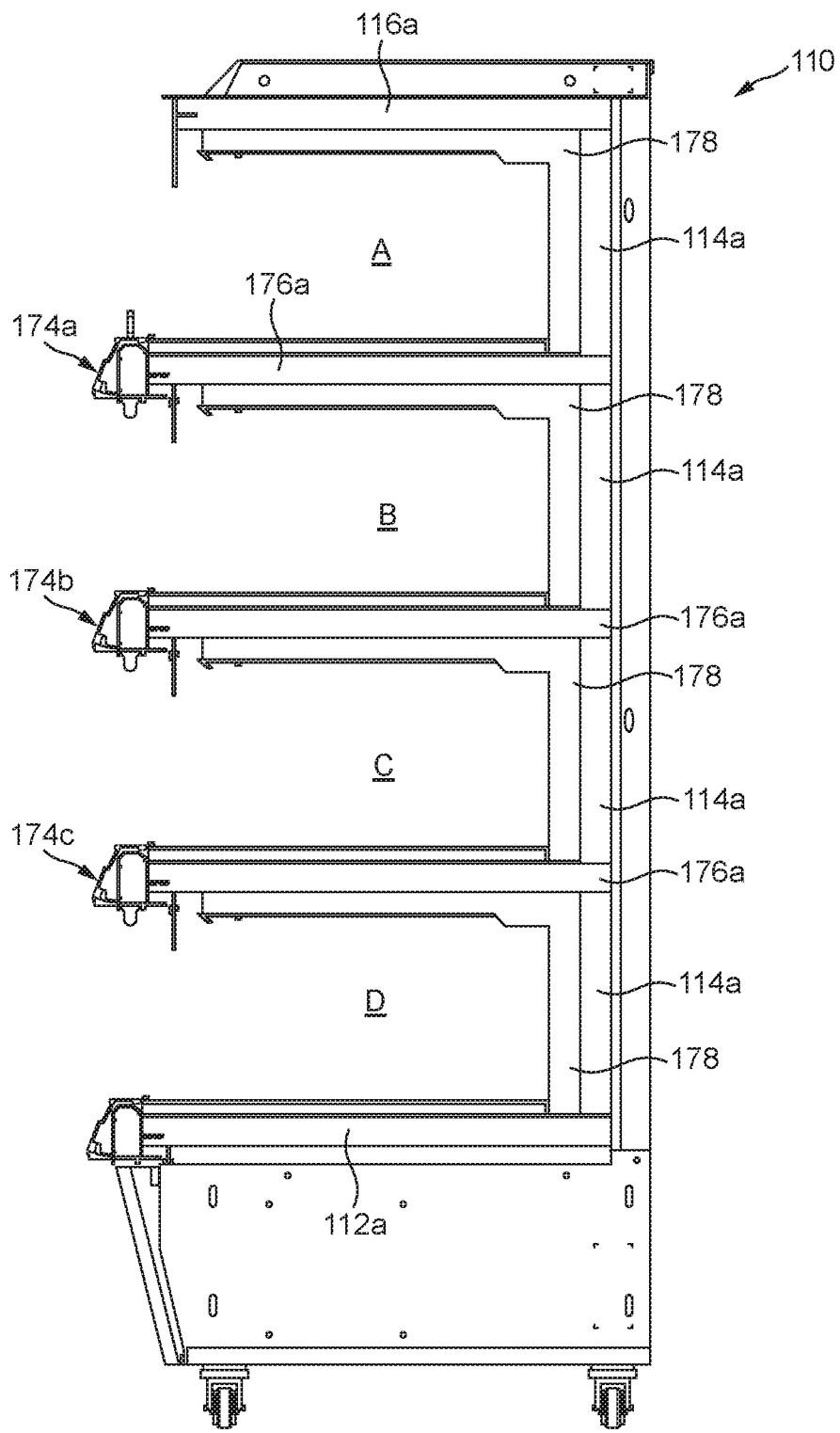
FIG. 9 shows a side view of the cabinet with the side panels removed.

The chassis 26 has a base panel 12a, a rear panel 14a and a top panel 16a. Each of the panels 12a,14a,16a is formed from a sandwich composite material. A cross-sectional representation of the composite material 28 is shown in FIG. 6. The composite material 28 comprises an inner core 30 of expanded polymer which is sandwiched between two opposing metal skins 32,34. The expanded polymer may comprise, for example, expanded polystyrene (EPS) having a density of approximately 30 grams per liter or expanded polypropylene (EPP) having a density of approximately 60 grams per liter. Alternatively, the expanded polymer may be of a specific density as required to provide the correct structural to insulation ratio for a given cabinet. The inner core 30 may have a thickness of between approximately 20 mm and 80 mm. As will be described in greater detail below, EPS is utilised for chilled or refrigerated cabinets 10, while EPP is utilised for heated cabinets 10. As will be described in greater detail below, multizone cabinets may be provided, and such cabinets may have both heated and chilled zones. In such embodiments EPP would be used. In yet a further embodiment, a cabinet may be configured to be either heated or chilled. In such an embodiment EPP would be used.

The chassis 26 this fulfils the dual roles of providing the primary structure for the cabinet 10 and further providing thermal insulation between the cabinet interior space 22 and the exterior of the cabinet 10 to the top 16, base 12 and rear 14 of the cabinet 10. As will be described in greater detail below, the interior space 22 of the cabinet 10 may be heated or chilled relative to the ambient temperature to the exterior of the cabinet 10. The thermal insulation provided by the chassis 26, depending upon whether the cabinet 10 is heated or chilled, acts to maintain the cabinet interior space 22 at a desired temperature. The thermal insulation provided by the chassis 26 further seeks to prevent the exterior top, rear and base faces of the cabinet 10 becoming excessively hot or cold. Excessive cooling on the exterior faces may lead to condensation forming on the cabinet 10, while excessive heating may lead to a user or consumer safety issue.

The opposing metal skins 32,34 may each be made from Aluminium alloy and have a thickness of between approximately 0.7 mm and 1.2 mm. In order to construct each of the panels 12a,14a,16a an inner core 30 is cut to the required shape, for example, utilising a water jet cutter. The outer metal layers 32,34 are also cut to the required shapes, for example using a punch or laser tool. The outer metal skins 32, 34 are then adhesively bonded to the inner core 30 using a platen press. Alternatively, the panels 12a,14a,16a may be formed by applying the blank metal outer skins 32,34 to an inner core 30 of standard size, and bonding them together using an adhesive and applying even pressure by a platen press. The panel 12a,14a,16a thus formed can then be cut to shape using either a water jet or router.

In order to construct the chassis 26 from the panels 12a,14a,16a, the panels 12a,14a,16a are mechanically connected to one another. The mechanical connection may be achieved by the use of fasteners which pass through an aperture one panel and are received in an insert on another panel. For example, threaded fasteners may be used and which are received in complementarily threaded inserts. In such an embodiment, the threaded inserts may be inserted into voids made in the inner core 30 by hot shaped formers. Although not shown, the chassis 26 may further be provided with substantially "L" shaped supports which extend between the rear 14a and top 16a panels to the interior of the chassis 26. Such supports would be manufactured from the same sandwich composite material as the rest of the chassis, and mechanically connected to the chassis 26 to provide additional rigidity to the structure. Threaded inserts can also be applied to the outer metal faces of any of the panels 12a,14a,16a for attachment to other panels or to additional metal foldings or structures.

The sides 18,20 of the cabinet 10 are formed by panels 18a,20a. In the embodiment shown, the panels 18a,20a are transparent and may be manufactured from, for example, toughened glass. As such, the side panels 18a,20a allow ambient light to enter cabinet interior 22, and further permit consumers to view the cabinet interior 22 from the side of the cabinet 10. It will be appreciated that in alternative embodiments the side panels 18a,20a may be opaque. The side panels 18a,20a may be double glazed units. Such double glazed units may comprise the entire side panels 18a,20a. Alternatively, the side panels 18a,20a may incorporate glazed inserts.

Each side panel 18a,20a is connected to the chassis 26 by threaded fasteners 36. The fasteners 36 extend through apertures of each panel 18a,20a and into complementarily threaded inserts located in the inner core 30 of the chassis 26. Alternatively, the side panels 18a,201 may be attached via bolts extending through brackets attached to the inner faces of the insulative panels 12a,14a,16a and into threaded inserts retained by the side panels.

The rear panel 14a of the chassis 26 is provided with a through aperture 38. In the embodiment shown the through aperture 38 is rectangular, however it will be appreciated that this shape is not intended to be limiting. The through aperture 38 corresponds in shape to a heater cassette generally designated 40. The cassette 40 includes a rectangular body 42, a pair of fans 44 and a pair ring shaped heating elements 46 which surround the fans 44. The fans and heating elements 44,46 are positioned on the side of the body 42 which faces the cabinet interior 22 when the heater cassette 40 is fitted to the aperture 38. In use, and as will be described in greater detail below, the fans 44 are operable to draw air over the heating elements 46, and then move the heated air into the cabinet interior 22.

In an alternative embodiment (not shown) the heater cassette 40 may be substituted with a chiller cassette operable to deliver chilled air to the cabinet interior 22. In such an embodiment the chiller cassette is provided with at least one fan 44 and a cooling arrangement. The cooling arrangement may, for example, comprise a miniature refrigeration circuit having compressor/condenser unit, or a piezoelectric cooling element. In other embodiments, the refrigeration compressing/condensing unit may be remote to the insulated body and be connected via pipework to the internal evaporator means. In a similar manner to the heater cassette 40, the chiller cassette is operable to draw air over the cooling arrangement, and then move the chilled air into the cabinet interior 22.

The interior space 22 of the cabinet 10 is further provided with a floor 48. The floor 48 is mounted to and supported by the base panel 16a of the chassis 26. Where the cabinet 10 is a heated cabinet, and thus is provided with a heater cassette 40, the floor 48 may be heated. In such an embodiment the floor 48 may be formed from a glass ceramic and further be provided with a resistive heating element.

The interior space 22 is further provided with an interior facia panel 50 which is spaced from the top 16a and rear 14a panels of the chassis 26. As can be seen from FIG. 4 the interior facia panel 50 is spaced from the top and rear panels 16a,14a so as to define a passageway 52 between the interior facia panel 50 and the top panel 16a, and a chamber 54 between the interior facia panel 50 and the rear panel 14a. In use, the fans 44 and heating elements 46 of the heater cassette 40 are positioned within the chamber 54. The interior facia panel 50 is further provided with a plurality of apertures 56 which permit fluid communication between the chamber 54 and the cabinet interior space 22. The apertures 56 are grouped so as to be adjacent the fans 44 of the heater cassette 40.

The top panel 16a of the chassis 26 is further provided with an upper profile member 58. The upper profile member 58 extends across the full width of the top panel 16a between the side panels 18a,20a. The upper profile member 58 is provided along the edge of the top panel 16a which partially defines the open front 24 of the cabinet 10. The upper profile member 58 may be formed by extrusion from Aluminium alloy. The upper profile member 58 is connected to the top panel 16a by the insertion of a projection 60 of the upper profile member 58 into expanded polymer inner core 30 of the top panel 16a. The upper profile member 58 is further provided with one or more lights 62 which, in use, are operable to illuminate the interior space 22 of the cabinet 10. The upper profile member 58 is further provided with a downwardly depending airflow deflector 64.

The base panel 12a of the chassis 26 is further provided with a lower profile member 66. The lower profile member 66 extends across the full width of the base panel 12a between the side panels 18a,20a. The lower profile member 66 is provided along the edge of the base panel 12a which partially defines the open front 24 of the cabinet 10. The lower profile member 66 may be formed by extrusion from Aluminium alloy. The lower profile member 66 is connected to the base panel 12a by the insertion of a projection 68 of the lower profile member 66 into expanded polymer inner core 30 of the base panel 12a. The lower profile member 66 is further provided with an upwardly projecting airflow deflector or riser 70.

In use, the cabinet 10 can be operated in a number of modes. Firstly, the cabinet 10 can be operated in an "OFF" mode. In such a mode the cabinet 10 is unlit and the heater cassette 40 is not operated. In the instance where the cabinet 10 is provided with a heated floor 48, this too is not operated. It will this be understood that the temperature of the interior space 22 will be substantially equal to the external ambient temperature. The lack of internal illumination should indicate to the observer that the cabinet 10 is not in operation.

The cabinet 10 can be operated in a "LIT" mode. In such a mode the lights 62 of the upper profile member 58 are operated so as to illuminate the interior space of the cabinet 10. In the "LIT" mode the heater cassette 40 is not operated and in the instance where the cabinet 10 is provided with a heated floor 48, this too is not operated. As with the "OFF" mode, the temperature of the interior space 22 will be substantially equal to the external ambient temperature. In the "LIT" mode the cabinet 10 may be used to store and display foodstuffs that do not require heating.

Figure 4:
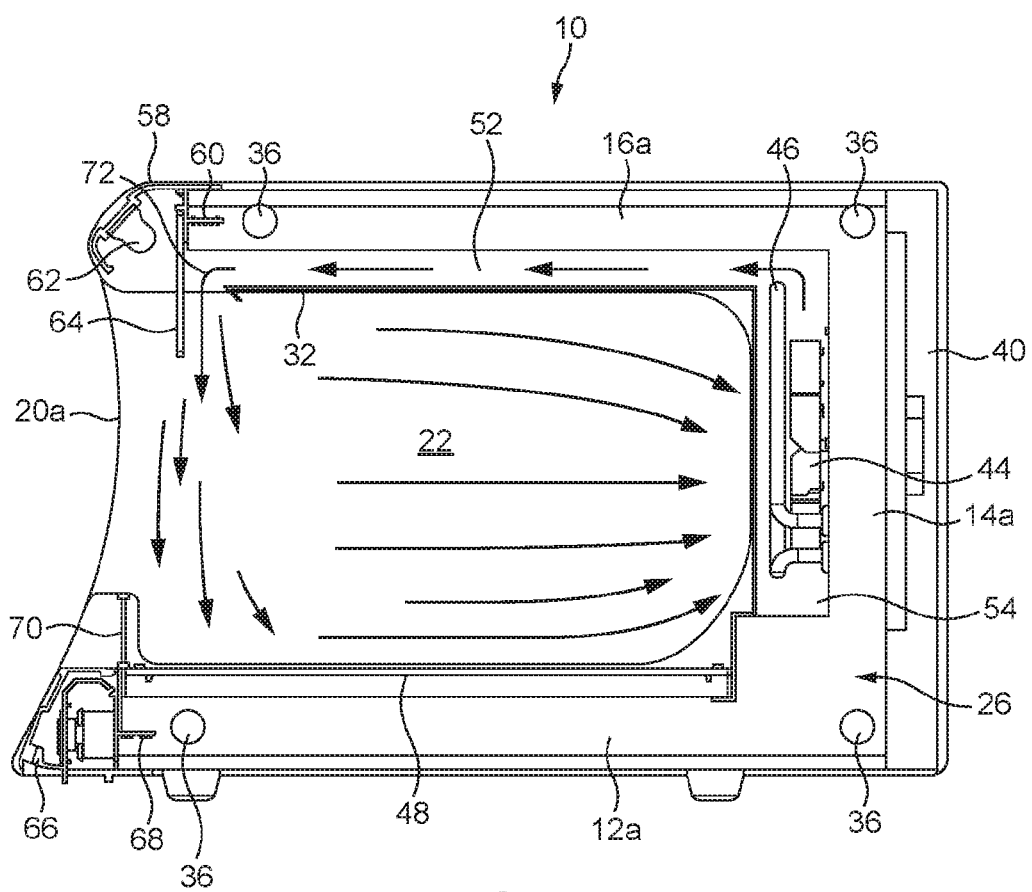
FIG. 4 shows a side view of the cabinet with one side panel removed.
Figure 5:
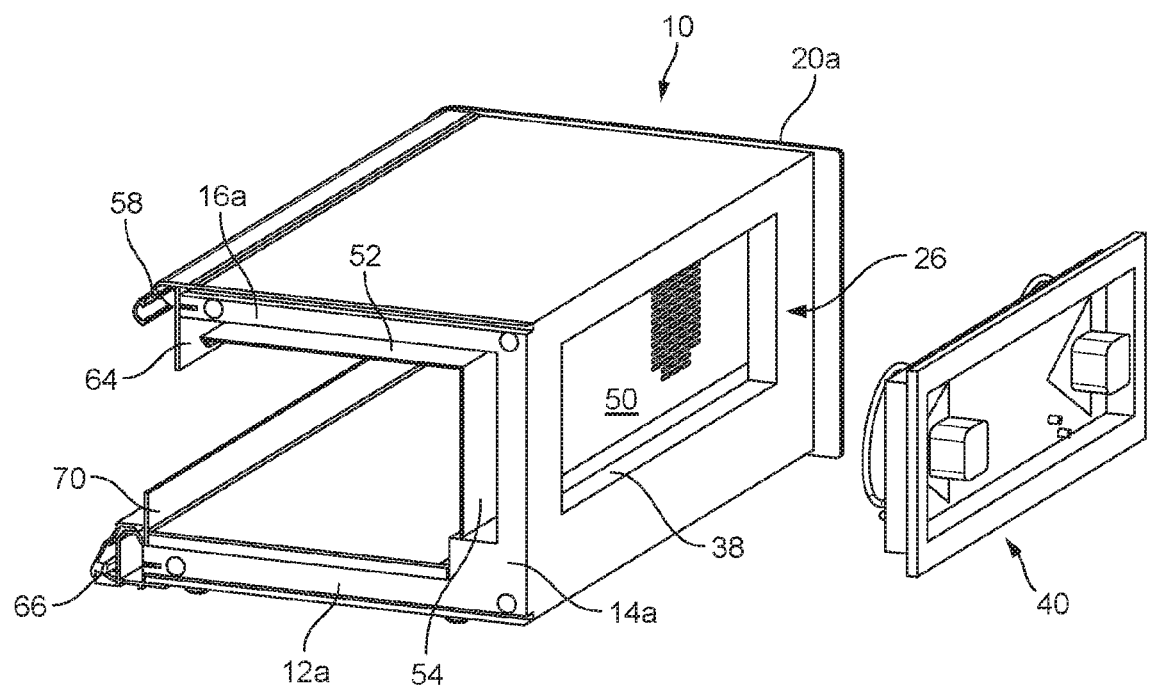
FIG. 5 shows a partially exploded perspective view of the cabinet.

The cabinet 10 may further be operated in a "HEATED" mode. In such a mode the heater cassette 40 is operated so as to raise the temperature within the interior space of the cabinet 10. The arrows shown on FIG. 4 illustrate the manner in which air is circulated within the interior space 22 of the cabinet. Operation of the fans 44 and heater elements 46 causes air within the chamber 54 to be heated and then forced into the duct 52 formed by panel 50 and the top insulated panel 16a and constrained by the side panels 18a,20a. The air is then passed out of aperture 72 and deflected by airflow deflector 64 in a downwardly direction over the front aperture 24 forming an air curtain over the open front of cabinet 10. The air curtain passes behind the lower riser 70 and travels across the floor 48 and generally across the extents of the interior of the space back towards the apertures 56 that allow access to air for the fans 44. The fan forces are centrifugal and accept the air on the fan blade face and distribute the air radially from the fan centre over the heaters 46. The heated air thus increases the temperature of the interior space 22. The cabinet 10 is provided with a thermostat to regulate the temperature within the interior space 22.

Where the cabinet 10 is provided with a heated floor 48, the "HEATED" mode of the cabinet 10 comprise heating of the floor 48 alone, operation of the heater cassette 40 alone, or heating of the floor 48 in combination with operation of the heater cassette 40.

It will be appreciated that multiple cabinets 10 may be stacked on top of one another or held in spaced relationship to one another in a rack or similar such holding apparatus. The cabinets 10 may be operated independently of one another so as to have interior spaces 22 with different temperatures. The thermal insulation characteristics of the chassis 26 of the cabinets 10 ensures that adjacent cabinets do not affect or influence the temperature of each other.

Referring now to FIGS. 7 to 10 there is shown an alternative embodiment of a cabinet generally designated 110. Features common to the embodiment of the cabinet 10 described with reference to FIGS. 1 to 6 are identified with like reference numerals. The cabinet 110 is both constructed and operable in the same manner as the cabinet 10 described with reference to FIGS. 1 to 6. The cabinet 110 differs in that the interior space 122 is divided in to separate portions or zones. In the embodiment shown, the interior space 122 is divided into four zones A, B, C and D. The temperature within each zone A, B, C, D can be controlled independently of the other zones.

The division of the interior space 122 is achieved by the provision of three horizontal shelves 174a,174b,174c. Each shelf 174a,174b,174c defines both the base of an upper zone and the top of a lower zone. The shelves 174a, 174b,174c are load bearing and thus can support food products placed thereupon.

Figure 10:
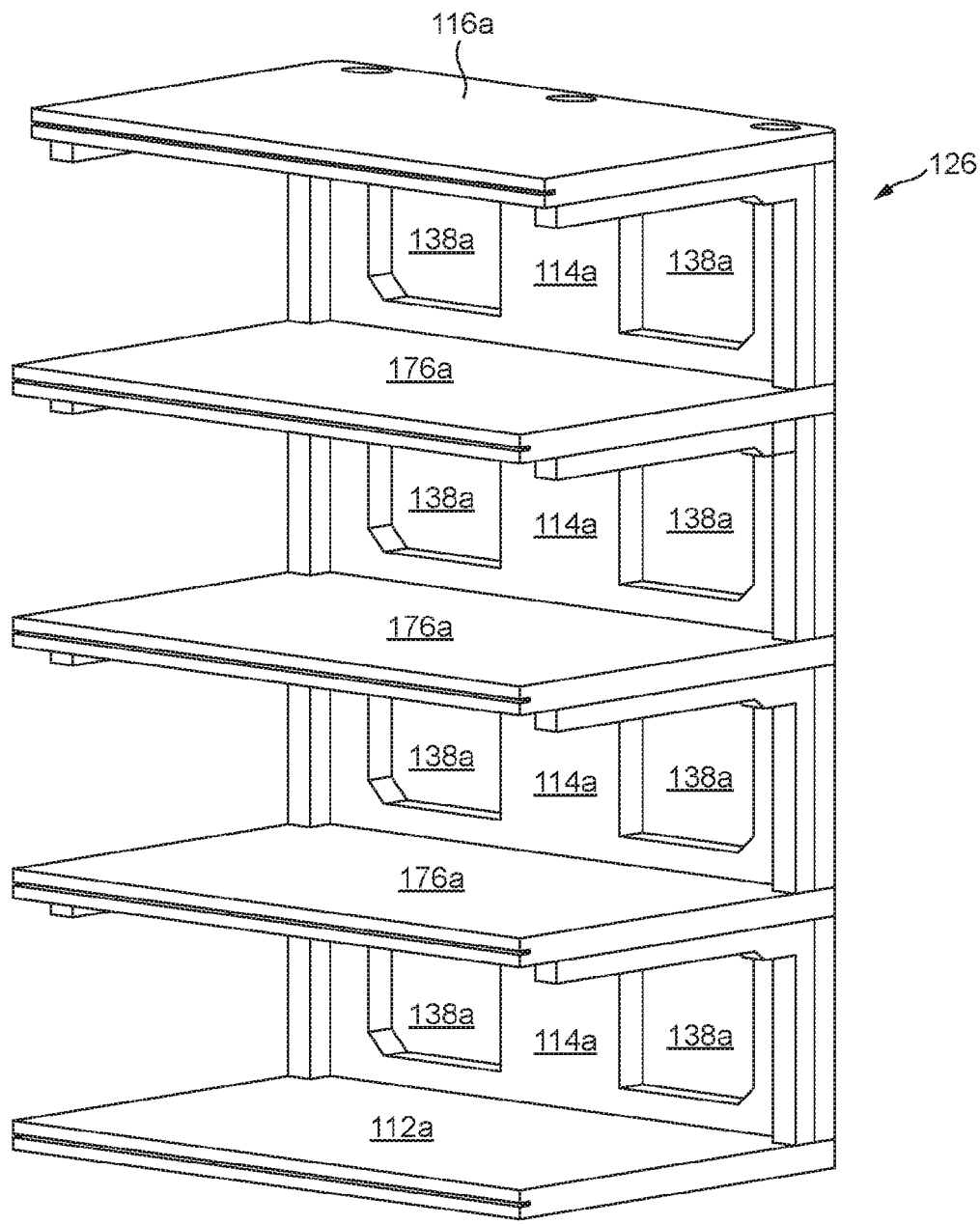
FIG. 10 shows a perspective view of the chassis of the cabinet.

FIG. 10 shows the chassis 126 of the cabinet 110. As before, the chassis 126 is constructed from a plurality of panels formed from a sandwich composite material. The composite material comprises an inner core of expanded polymer which is sandwiched between two opposing metal skins. The chassis 126 comprises a base panel 112a, a top panel 116a, four rear panels 114a and three intermediate panels 176a which define the aforementioned shelves 174a, 174b,174c. The chassis 126 is further provided "L" shaped supports 178 which extend between the rear 114a and top 116a panel, and rear 114a and intermediate panels 176a to the interior of the chassis 26. As before, the panels 112a, 114a,116a,176a are mechanically connected to one another to form the chassis 126.

The chassis 126 forms the primary load bearing structure of the cabinet 110. The chassis 126 further provides thermal insulation between the interior and exterior of the cabinet 110. The intermediate panels 176a further serve to provide a thermal barrier between the interior zones A, B, C, D of the cabinet 110.

In the embodiment shown, the cabinet 110 has four zones A, B, C, D. It will be appreciated that the same construction method may be utilised to produce a cabinet with as few as two zones, or more than four zones.

The invention claimed is:

1. An open fronted food storage cabinet, comprising:
a top, rear, base and opposed sides, the top, rear, base and opposed sides defining an interior space of the cabinet which is accessible through an opening to a front of the cabinet defined between edges of the top, base, and opposing sides of the cabinet, wherein the cabinet includes an interior chassis structure comprised of a base panel, a plurality of rear panels, a top panel and at least one intermediate panel which are mechanically connected to one another, the at least one intermediate panel being positioned between adjacent ones of the plurality of rear panels to divide the interior space into at least two portions, further wherein the base panel, plurality of rear panels, at least one intermediate panel and top panel are each formed from a structural sandwich composite material having thermal insulation properties, and further wherein at least one of the plurality of rear panels includes an aperture; and
a cassette disposed in the aperture, the cassette including a mechanism operable to alter the temperature within the interior space, the cassette being fittable to and removable from the aperture.

2. An open fronted food storage cabinet according to claim 1, wherein the structural sandwich composite material includes an inner core of expanded polymer and outer metal layers.

3. An open fronted food storage cabinet according to claim 2, wherein the expanded polymer is selected from the group consisting of expanded polystyrene and expanded polypropylene.

4. An open fronted food storage cabinet according to claim 2, wherein the outer metal layers are Aluminium alloy.

5. An open fronted food storage cabinet according to claim 1, wherein the opposed sides of the cabinet comprise side panels which are mounted to the chassis structure of the cabinet.

6. An open fronted food storage cabinet according to claim 5, wherein the structural sandwich composite material includes an inner core of expanded polymer, further wherein the side panels are mounted to the chassis structure by fasteners which extend through apertures in the side panels and into fixtures located within the expanded polymer of the chassis.

7. An open fronted food storage cabinet according to claim 1, wherein the mechanism operable to alter the temperature within interior space of the cabinet is a heating mechanism.

8. An open fronted food storage cabinet according to claim 7, wherein the heating mechanism includes an electric heating element and a fan.

9. An open fronted food storage cabinet according to claim 8, wherein the cabinet includes an additional heating means located in a lower region of the cabinet interior space.

10. An open fronted food storage cabinet according to claim 9, wherein the additional heating means is a heated floor of the cabinet interior space.

11. An open fronted food storage cabinet according to claim 10, wherein the heated floor comprises a glass ceramic plate and an electrical resistance heater.

12. An open fronted food storage cabinet according to claim 10, wherein the heated floor of the cabinet is operable independently of the fan and heating element of the heating mechanism.

13. An open fronted food storage cabinet according to claim 1, wherein the mechanism operable to alter the temperature within interior space of the cabinet is a cooling mechanism.

14. An open fronted food storage cabinet according to claim 13, wherein the cooling mechanism includes a fan and refrigeration circuit or a Peltier device.

15. An open fronted food storage cabinet according to claim 1, wherein the at least one intermediate panel comprises a plurality of intermediate panels, the plurality of intermediate panels dividing the interior space into a plurality of portions.

* * * * *